United States Patent
Sanderovich et al.

(10) Patent No.: US 10,321,487 B2
(45) Date of Patent: Jun. 11, 2019

(54) TECHNIQUE FOR INCREASING THROUGHPUT FOR CHANNEL BONDING

(71) Applicant: QUALCOMM Incorporated, San Diego, CA (US)

(72) Inventors: Amichai Sanderovich, Atlit (IL); Mordechay Aharon, Pardes Hana Karcur (IL); Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 15/455,091

(22) Filed: Mar. 9, 2017

(65) Prior Publication Data
US 2017/0265224 A1  Sep. 14, 2017

Related U.S. Application Data

(60) Provisional application No. 62/306,622, filed on Mar. 10, 2016.

(51) Int. Cl.
| | |
|---|---|
| H04B 7/08 | (2006.01) |
| H04W 74/08 | (2009.01) |
| H04W 72/04 | (2009.01) |
| H04L 25/06 | (2006.01) |
| H04B 7/0413 | (2017.01) |
| H04W 28/02 | (2009.01) |
| H04W 74/00 | (2009.01) |

(52) U.S. Cl.
CPC ...... *H04W 74/0816* (2013.01); *H04B 7/0413* (2013.01); *H04B 7/0805* (2013.01); *H04L 25/067* (2013.01); *H04W 28/02* (2013.01); *H04W 72/04* (2013.01); *H04W 74/00* (2013.01); *H04B 7/088* (2013.01)

(58) Field of Classification Search
CPC .................................................... H04B 7/0413
USPC ........................................................ 370/329
See application file for complete search history.

(56) References Cited

U.S. PATENT DOCUMENTS

| | | | | |
|---|---|---|---|---|
| 8,196,016 B1 * | 6/2012 | Langner | ................. | H03M 13/11 |
| | | | | 714/758 |
| 8,582,696 B2 * | 11/2013 | Oh | ........................ | H04L 25/067 |
| | | | | 375/262 |

(Continued)

FOREIGN PATENT DOCUMENTS

| | | |
|---|---|---|
| WO | 2007146685 A1 | 12/2007 |
| WO | 2009154406 A2 | 12/2009 |
| WO | 2012040495 A1 | 3/2012 |

OTHER PUBLICATIONS

Cordeiro C., "Specification Framework for TGay ; 11-15-1358-08-00ay-specification-framework-for-tgay", IEEE Draft; vol. 802.11 ay, No. 8, Nov. 23, 2016, XP068110625, Retrieved from the Internet: URL:https://mentor.ieee.org/802.11/dcn/15/11-15-1358-08-00ay-specification-framework-for-tgay.doc, pp. 1-89.

(Continued)

*Primary Examiner* — Shripal K Khajuria
(74) *Attorney, Agent, or Firm* — Patterson & Sheridan, L.L.P. Qualcomm

(57) ABSTRACT

Certain aspects of the present disclosure provide methods and apparatus for performing communications using a bonded channel across multiple channels.

18 Claims, 9 Drawing Sheets

(56) References Cited

U.S. PATENT DOCUMENTS

| | | | |
|---|---|---|---|
| 2007/0157069 A1* | 7/2007 | Lyakh | H04L 1/0072 |
| | | | 714/791 |
| 2010/0181943 A1* | 7/2010 | Phan | A63H 27/02 |
| | | | 318/16 |
| 2013/0249756 A1* | 9/2013 | Honda | H01Q 13/12 |
| | | | 343/770 |
| 2015/0188596 A1 | 7/2015 | Chen et al. | |
| 2017/0366983 A1* | 12/2017 | Gunasekara | H04L 43/0811 |

OTHER PUBLICATIONS

Partial International Search Report—PCT/US2017/021741—ISA/EPO—dated Jun. 16, 2017.
International Search Report and Written Opinion—PCT/US2017/021741—ISA/EPO—dated Sep. 14, 2017.

* cited by examiner

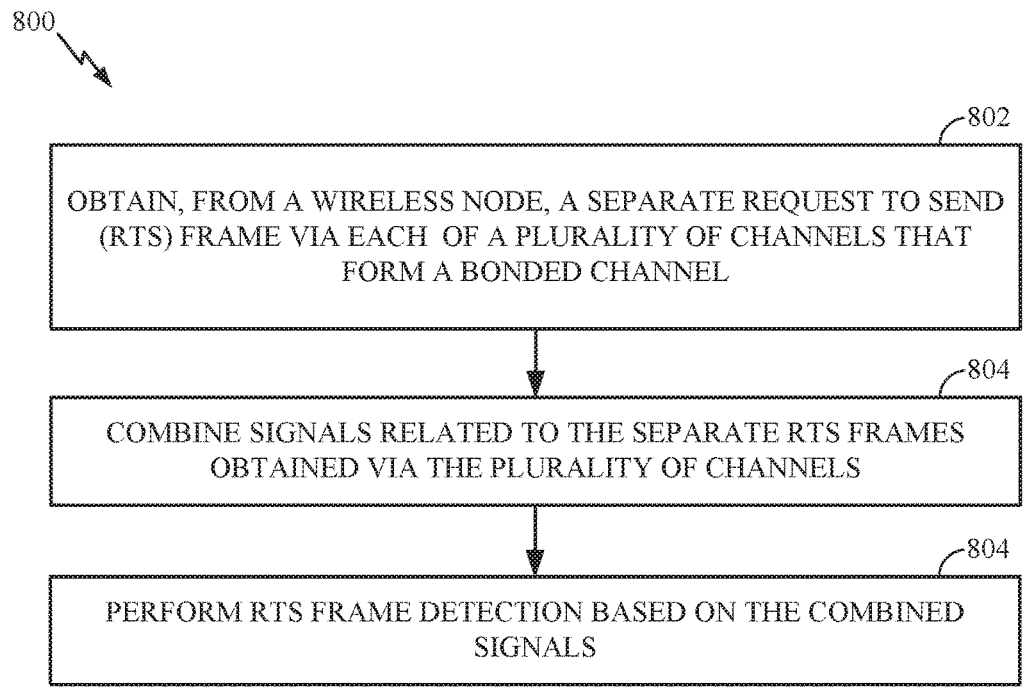

TECHNIQUE FOR INCREASING THROUGHPUT FOR CHANNEL BONDING

CLAIM OF PRIORITY UNDER 35 U.S.C. § 119

The present Application for Patent claims benefit of U.S. Provisional Patent Application Ser. No. 62/306,622, filed Mar. 10, 2016, assigned to the assignee hereof and hereby expressly incorporated by reference herein.

FIELD

Certain aspects of the present disclosure generally relate to wireless communications and, more particularly, to performing channel estimation for bonded channels.

BACKGROUND

In order to address the issue of increasing bandwidth requirements demanded for wireless communications systems, different schemes are being developed to allow multiple user terminals to communicate with a single access point by sharing the channel resources while achieving high data throughputs.

The Institute of Electrical and Electronics Engineers (IEEE) 802.11standard. The IEEE 802.11 standard denotes a set of Wireless Local Area Network (WLAN) air interface standards developed by the IEEE 802.11 committee for short-range communications (e.g., tens of meters to a few hundred meters).

Amendment 802.11ad to the WLAN standard defines the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

IEEE 802.11ay s a proposed enhancement to the current technical standards for wireless networks, with mechanisms for channel bonding and MU-MIMO technologies. Where 802.11ad uses a maximum of 2.16 GHz bandwidth, 802.11 ay may bond, for example, four of those channels together for a maximum bandwidth of 8.64 GHz. MIMO is also added with a maximum of 4 streams.

SUMMARY

Certain aspects of the present disclosure provide an apparatus for wireless communications. The apparatus generally includes a processing system configured to generate a first frame that requests a wireless node to adjust its receive antenna configuration and an interface configured to output the first frame for transmission to the wireless node via at least one of a plurality of channels that form a bonded channel; wherein the processing system is further configured to generate at least one request to send (RTS) frame to transmit to the wireless node, and the first interface is further configured to output the at least one RTS frame for transmission to the wireless node via the bonded channel.

Certain aspects of the present disclosure provide an apparatus for wireless communications. The apparatus generally includes an interface configured to obtain a first frame via at least one of a plurality of channels that form a bonded channel and a processing system configured to place the apparatus in a first receiver mode after obtaining the first frame; wherein the interface is also configured to obtain at least one request to send (RTS) frame via the bonded channel while the apparatus while in the first receiver mode.

Certain aspects of the present disclosure provide an apparatus for wireless communications. The apparatus generally includes an interface configured to obtain, from a wireless node, a separate request to send (RTS) frame via each of a plurality of channels that form a bonded channel; and a processing system configured to combine signals related to the separate RTS frames obtained via the plurality of channels and to perform RTS frame detection based on the combined signals.

Aspects of the present disclosure also provide various methods, means, and computer program products corresponding to the apparatuses and operations described above.

BRIEF DESCRIPTION OF THE DRAWINGS

FIG. 8 illustrates example operations that may be performed by a receiving device, in accordance with certain aspects of the present disclosure.

FIG. 8A illustrates example means capable of performing the operations illustrated in FIG. 8.

DETAILED DESCRIPTION

Figure 1:
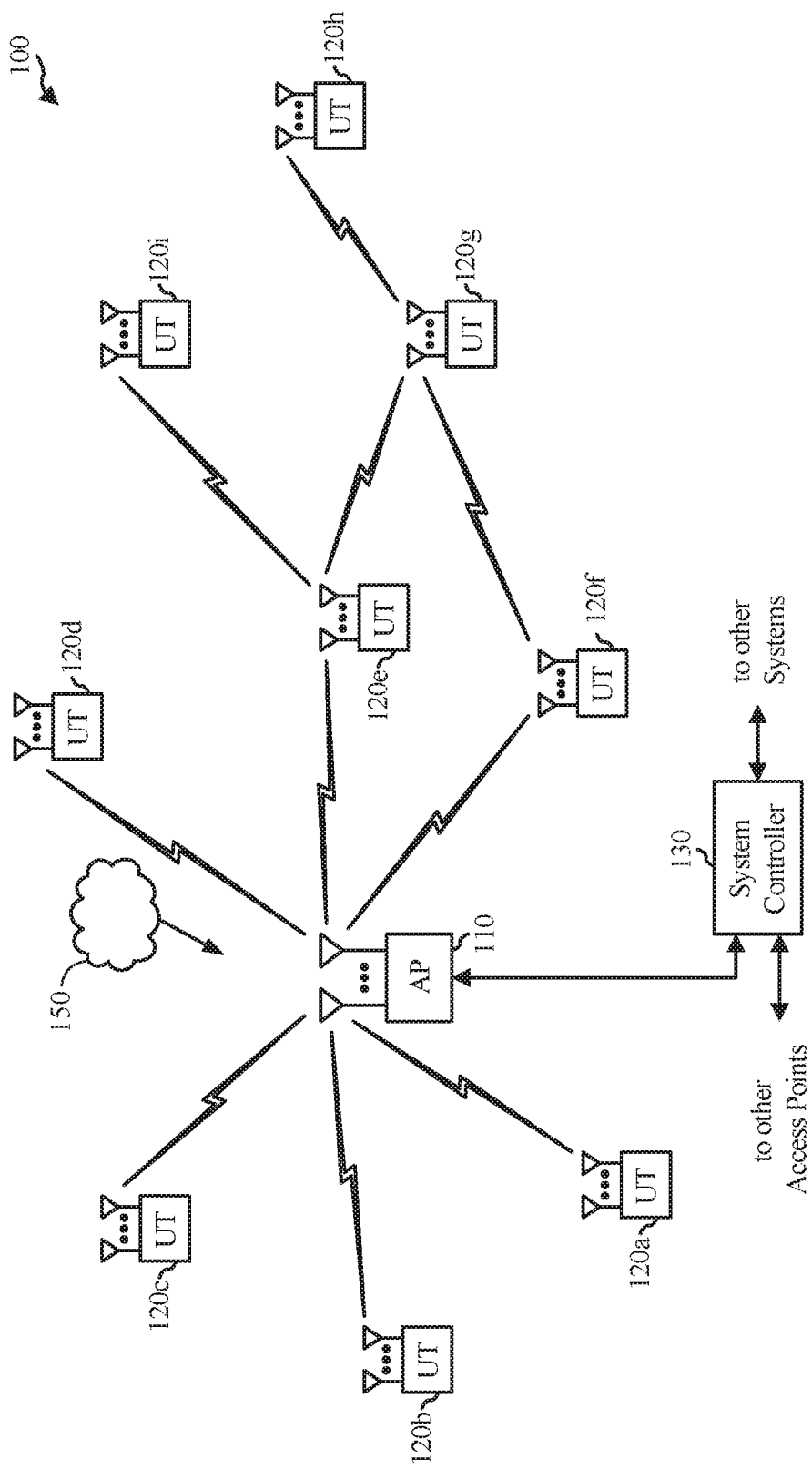
FIG. 1 is a diagram of an example wireless communications network, in accordance with certain aspects of the present disclosure.

Aspects of the present disclosure provide techniques for performing channel estimation of a bonded channel formed by bonding a plurality of channels by using channel estimation training sequences transmitted in each of the plurality of channels.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may include an access point or an access terminal.

An access point ("AP") may include, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may include, be implemented as, or known as a subscriber station, a subscriber unit, a mobile station, a remote station, a remote terminal, a user terminal, a user agent, a user device, user equipment, a user station, or some other terminology. In some implementations, an access terminal may include a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point 110 is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point 110 to the user terminals, and the uplink (i.e., reverse link) is the communication link from the user terminals to the access point 110. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending the older versions of user terminals useful lifetime, while allowing newer SDMA user terminals to be introduced as deemed appropriate.

The MIMO system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it may be desired to have $N_{ap} \geq K \geq 1$ if the data symbol streams for the K user terminals are not multiplexed in code, frequency or time by some means. K may be greater than $N_{ap}$ if the data symbol streams may be multiplexed using TDMA technique, different code channels with CDMA, disjoint sets of subbands with OFDM, and so on. Each selected user terminal transmits user-specific data to and/or receives user-specific data from the access point 110. In general, each selected user terminal may be equipped with one or multiple antennas (i.e., $N_{ut} \geq 1$). The K selected user terminals may have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The MIMO system 100 may also be a TDMA system if the user terminals 120 share the same frequency channel by dividing transmission/reception into different time slots, each time slot being assigned to different user terminal 120.

Figure 2:
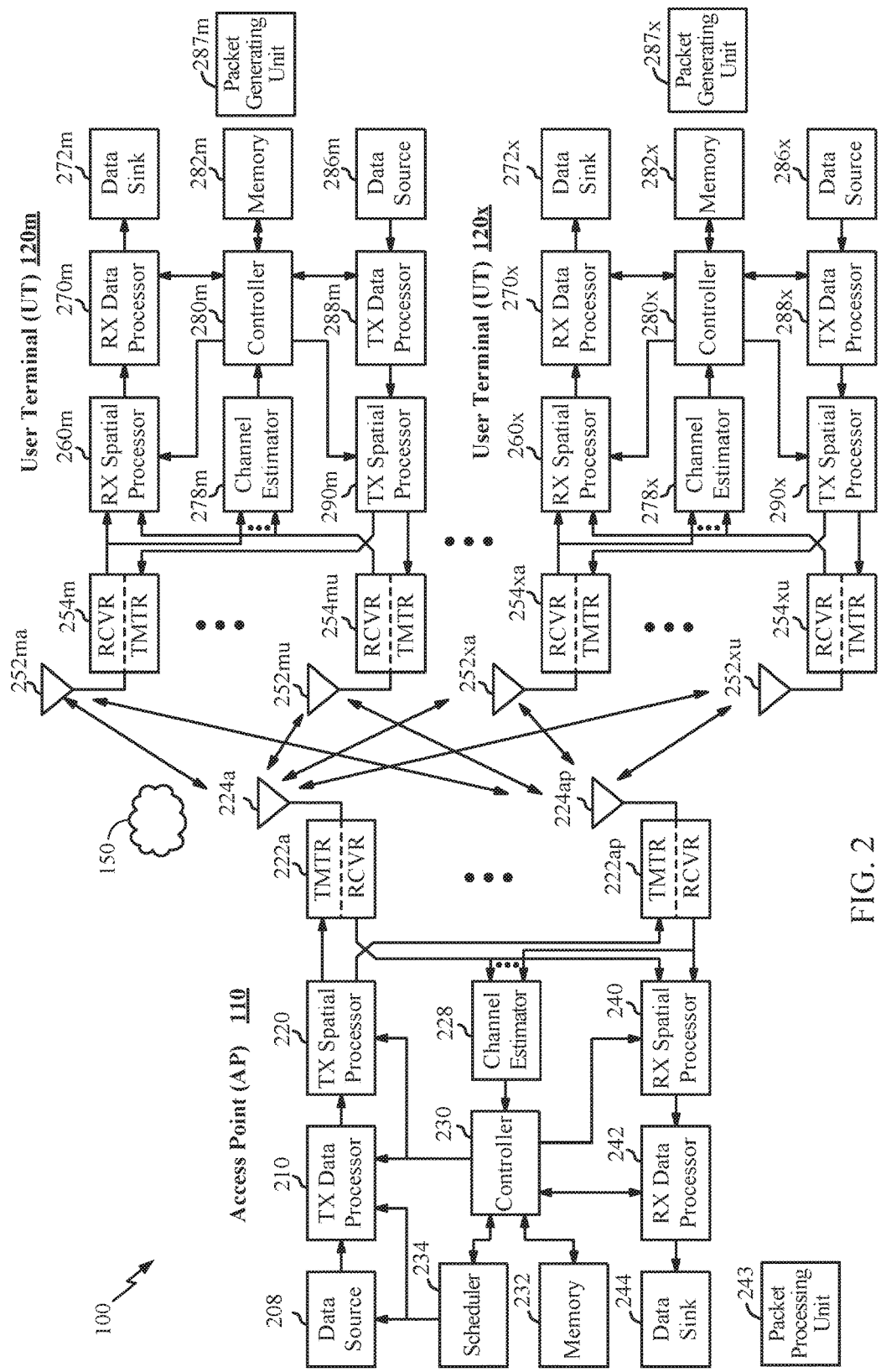
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) of transceivers 254 receives and processes (e.g., converts to analog, amplifies, filters, and frequency upconverts) a respective transmit symbol stream to generate an uplink signal. $N_{ut,m}$ transmitter units of transceivers 254 provide $N_{ut,m}$ uplink signals for transmission from $N_{ut,m}$ antennas 252 to the access point 110.

Nup user terminals may be scheduled for simultaneous transmission on the uplink. Each of these user terminals performs spatial processing on the Nup user terminals' data symbol stream and transmits the Nup user terminals' set of transmit symbol streams on the uplink to the access point 110.

At access point 110, $N_{ap}$ antennas 224a through 224ap receive the uplink signals from all Nup user terminals transmitting on the uplink. Each antenna 224 provides a received signal to a respective receiver unit (RCVR) of transceivers 222. Each receiver unit of transceivers 222 performs processing complementary to that performed by a transmitter unit of transceivers 254 and provides a received symbol stream. An RX spatial processor 240 performs receiver spatial processing on the $N_{ap}$ received symbol streams from $N_{ap}$ receiver units of transceivers 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas 224. Each transmitter unit of a transceiver 222 receives and processes a respective transmit symbol stream to generate a downlink signal. $N_{ap}$ transmitter units of transceivers 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit of transceivers 254 processes a received signal from an associated antenna 252 and provides a received symbol stream. An RX spatial processor 260 performs receiver spatial processing on $N_{ut,m}$ received symbol streams from $N_{ut,m}$ receiver units of transceivers 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point 110 based on the effective uplink channel response matrix $H_{up,eff}$. Controller 280 for each user terminal may send feedback information (e.g., the downlink and/or uplink eigenvectors, eigenvalues, SNR estimates, and so on) to the access point 110. Controllers 230 and 280 also control the operation of various processing units at access point 110 and user terminal 120, respectively.

Figure 3:
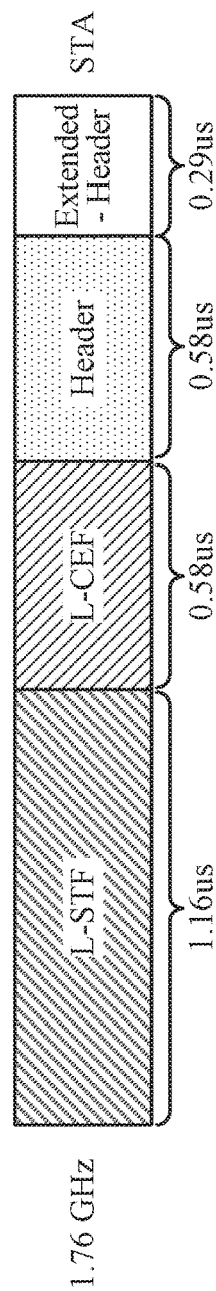
FIGS. 3-4 illustrate example frame formats and transmission on multiple channels, in accordance with certain aspects of the present disclosure.
Figure 4:
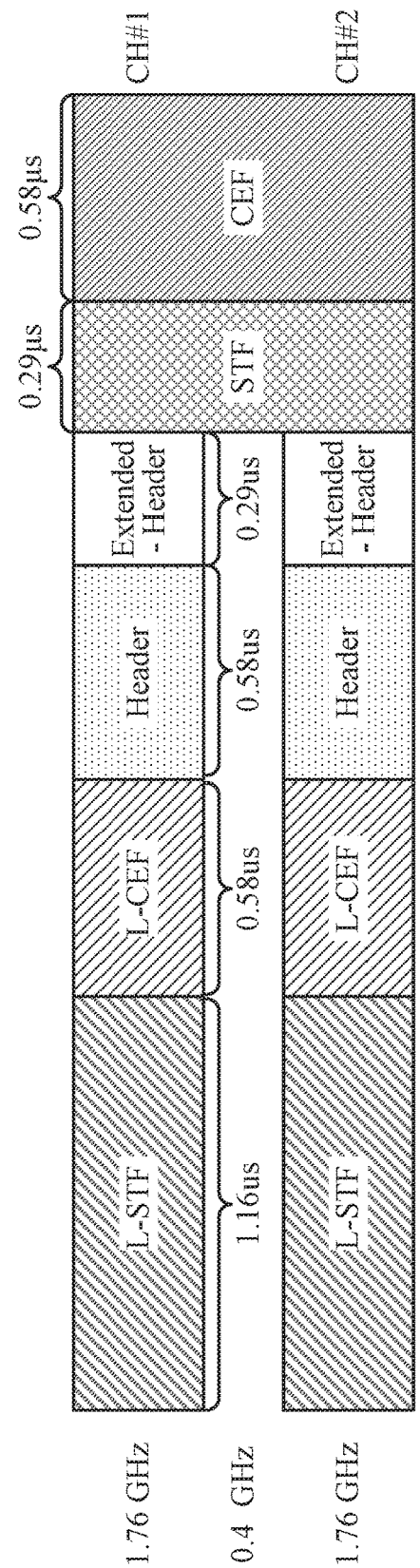

As illustrated, in FIGS. 1 and 2, one or more user terminals 120 may send one or more High Efficiency WLAN (HEW) packets 150, with a preamble format as described herein (e.g., in accordance with one of the example formats shown in FIGS. 3A-4), to the access point 110 as part of a UL MU-MIMO transmission, for example. Each HEW packet 150 may be transmitted on a set of one or more spatial streams (e.g., up to 4).

The HEW packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the HEW packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a HEW packet 150 based on the IEEE 802.11 HEW standard, but may interpret a legacy packet (e.g., a packet complying with IEEE 802.11a/b/g) in a different manner, according to the standards amendment associated therewith.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Aspects of the present disclosure provide techniques for communications using bonded channels. The techniques may be used, for example, in systems where stations capable of directionally transmitting on multiple channels (e.g., double/triple/quadruple 802.11 bands) coexist with legacy devices (e.g., devices capable of only communicating in a single band).

One approach, is to send preamble information (e.g., the preambles, sequences (e.g., channel estimation sequences), and data that are sent before the station transmits multi-channel data), in all single channels overlapping the multi-channel. Because several estimations are used to enable operations on the multi-channel, STAs generally send additional preamble, sequences (e.g., channel estimation sequences), and header data using the double channel (known as HT-STF and VHT-STF and HT-LTF and VHT-LTF in 802.11n and 802.11ac respectively).

In some cases, the channel estimation training sequences on each of the plurality of channels may include a sequence of Golay sequences. In some cases, the channel estimation training sequences may include complementary sequences of codes.

FIG. 3 illustrates an example preamble structure that may be used for transmissions without MIMO or channel bonding. As illustrated, the preamble structure may maintain some legacy (e.g., IEEE 802.11ad) preamble features. For example, as illustrated, the preamble structure may include legacy Short Training Fields (L-STFs), channel estimation information (e.g., a channel estimation sequence in a legacy channel estimation field, (L-CEF)), and legacy header information. Maintaining some legacy preamble features may allow for better collision protection (by legacy and non-legacy devices).

As illustrated, the preamble structure may additionally include extended header information, for example, to allow for new modes. While the header information may include information used to demodulate the data, and the header information may be demodulated by all stations in range. The extended header may include additional information that is used only for the receiving station.

As illustrated in FIG. 4, a similar structure may be utilized for frames transmitted with channel bonding. In this case, legacy preambles, which may include L-STF, L-CEF, and legacy headers may be transmitted on each channel, with extended headers, followed by a wider channel STF and CEF (due to the channel bonding). The STF and CEF that follow the headers may be new (e.g., non-legacy) sequences. As illustrated, a channel estimation sequence may be transmitted on each channel, and a channel estimation sequence need not be transmitted in gaps between the channels.

As noted above, the 802.11ay standard increase the physical layer (PHY) throughput in 60 GHz by using methods such as MIMO and channel bonding/channel aggregation. In general, the difference between channel bonding and channel aggregation is that in channel bonding a wider channel is created while in channel aggregation multiple standard bandwidth channels are used together.

The packet structure for EDMG typically includes a preamble (L-STF, L-CEF), a legacy header for compatibility, an EDMG-A header (Enhanced DMG) EDMG training fields (EDMG STF, EDMG CEF) and then EDMG (flay modulation) data. Most of the EDMG frames may include TRN fields at the end of the frame. These TRN fields can be transmitted separately on each of the bonded channels or on the full bonded bandwidth.

The standard will also support MIMO configurations, for example, of up to 8 spatial streams and up to 4 channels in aggregation. In theory, each of these spatial streams may have a different MCS (Modulation & Coding Scheme). In some cases, the EDMG-A header has 112 bits for indicating features, many of which are needed for purposes other than signaling MCS for different spatial streams. A challenge is thus presented in how to indicate the MCS for the different MIMO streams and different channels in aggregation in an efficient manner.

The standard will also support MIMO configurations, SU-MIMO and MU-MIMO, for example, of up to 8 spatial streams and up to 4 channels in aggregation. In this case the TRN fields can be transmitted sequentially from each transmitting chain as transmitted in SISO mode, or by using orthogonal Golay sequences transmitted from all transmitting chain in MIMO mode.

In high frequency (e.g., mmWave) communication systems like 60 GHz (e.g., 802.11ad and 802.11ay), communication is based on beamforming (BF), using phased arrays on both sides for achieving good link. As described above, beamforming (BF) generally refers to a mechanism used by a pair of STAs to adjust transmit and/or receive antenna settings achieve desired link budget for subsequent communication.

BF training typically involves a bidirectional sequence of BF training frame transmissions between stations (STA1 and STA2 in this example) that uses a sector sweep followed by a beam refining phase (BRP). For example, an AP or non-AP STA may initiate such a procedure to establish an initial link. During the sector sweep, each transmission is sent using a different sector (covering a directional beam of a certain width) identified in the frame and provides the necessary signaling to allow each STA to determine appropriate antenna system settings for both transmission and reception.

Example Techniques for Increasing Throughput for Channel Bonding

Aspects of the present disclosure provide techniques that may help increase throughput for communications using bonded channels. The techniques may be used, for example, in systems where stations capable of transmitting on multiple channels (e.g., double/triple/quadruple 802.11 bands) coexist with legacy devices (e.g., devices capable of only communicating in a single band).

For channel bonding devices working in mmWave, antenna arrays may be quite large. Training is typically performed to identify optimal (receive) antenna configurations for receiving transmissions from certain directions. This training is conventionally performed using only a single channel, and the receiving antenna is in an omnidirectional (Omni) mode, rather than a directional mode. In this manner, the link budget of the training may be maximized and the training result may be close to optimal.

When working with channel bonding, there may sometimes be a requirement to send RTS and then CTS across all the bonded channels. This exchange serves two general purposes. First, this sets the transmit opportunity (TXOP) for all the bonded channels (putting devices on notice) to avoid interference. Second, the RTS directs the receive antenna to the direction of the originating source of the RTS. This second result may be used in order for the STA to be able to receive communication from all directions.

Unfortunately, the above-mentioned exchange may suffer as the RTS on each channel is reduced in transmission power, when compared to the single channel. Because the receiver waits on a single channel, and in an Omni mode, the receiver may miss (not detect) this RTS. As a result, channel bonding may not be used, even though when working in directed mode, in terms of link-budget, channel bonding may be available Aspects of the present disclosure provide techniques that may help address these issues and, as a result, may help increase throughput for communications using bonded channels.

According to certain aspects of the present disclosure, a transmitter may send a frame before the RTS to indicate a receiver (currently in Omni mode) should switch to a directed mode. The receiver may then receive the RTS over the bonded channels when in the directed mode. In the directed (or directional) mode, the receiver antenna configuration may be optimized for reception in an appropriate direction, for example, as determined based on the frame sent before the RTS.

Figure 5:
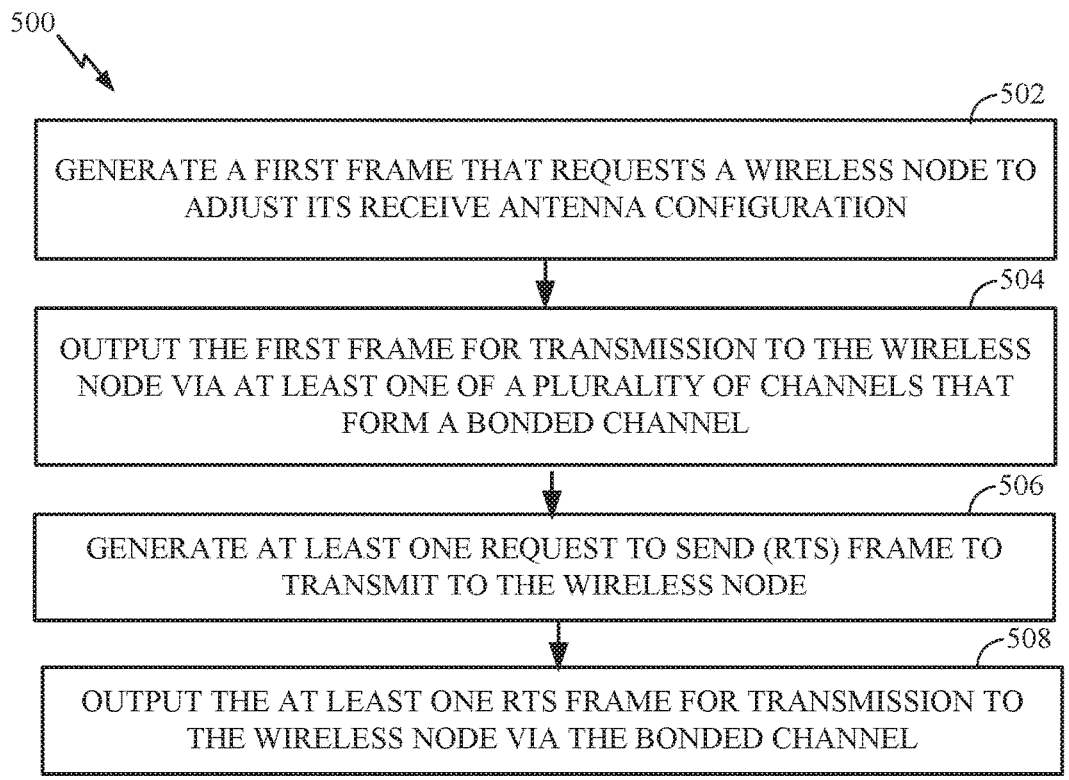
FIG. 5 illustrates example operations that may be performed by a transmitting device, in accordance with certain aspects of the present disclosure.

FIG. 5 illustrates example operations 500 that may be performed by a transmitting apparatus (transmitter), in accordance with aspects of the present disclosure. The transmitting apparatus may be any suitable type of wireless node.

The operations 500 begin, at 502, by generating a first frame that requests a wireless node to adjust its receive antenna configuration. The first receiver mode may correspond to a directional receiver mode in which the wireless node adjusts a receive antenna configuration to enhance reception of transmissions from a particular direction, whereas conventional receivers typically enhance their operational bandwidth to be able to receive in all the subsequent bonded channels. At 504, the transmitter output the first frame for transmission to the wireless node via at least one of a plurality of channels that form a bonded channel. At 506, the transmitter generates at least one request to send (RTS) frame to transmit to the wireless node. At 508, the transmitter outputs the at least one RTS frame for transmission to the wireless node via the bonded channel.

Figure 6:
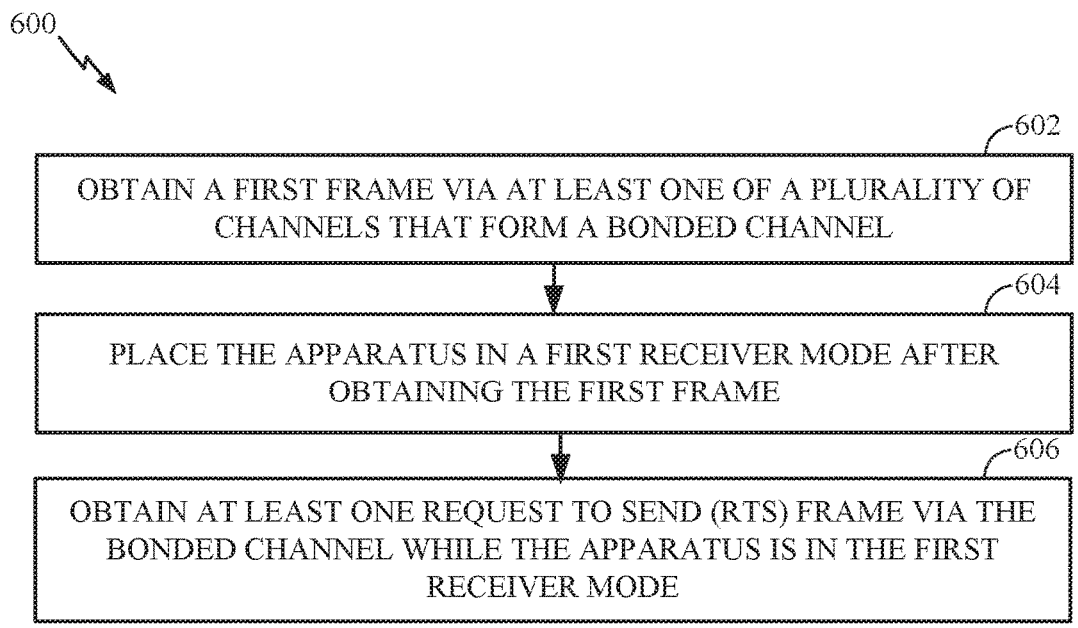
FIG. 6 illustrates example operations that may be performed by a receiving device, in accordance with certain aspects of the present disclosure.

FIG. 6 illustrates example operations 600 that may be performed by a receiving apparatus (receiver), in accordance with aspects of the present disclosure. The receiving apparatus may be any suitable type of wireless node, for example, receiving frames from a transmitting device performing operations 500 described above.

The operations 600 begin, at 602, by obtaining a first frame via at least one of a plurality of channels that form a bonded channel. At 604, the receiver is placed in a first receiver mode after obtaining the first frame. At 606, the receiver obtains at least one request to send (RTS) frame via the bonded channel while the apparatus while in the first receiver mode.

Figure 7:
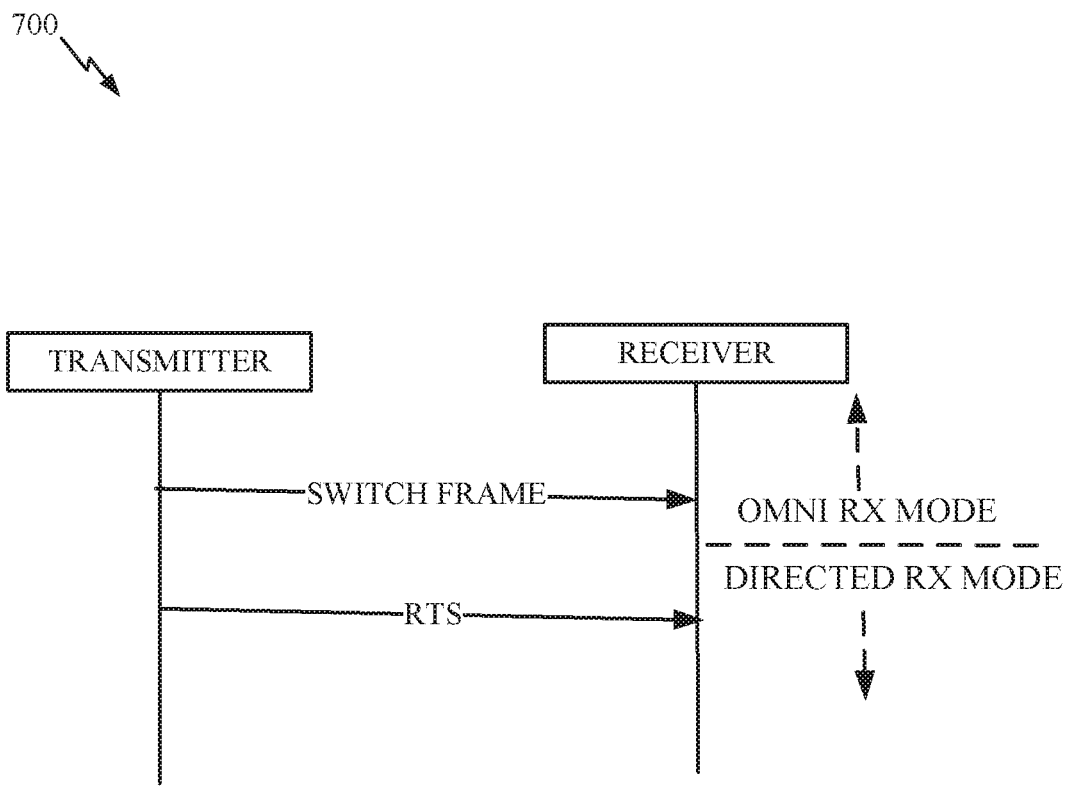
FIG. 7 illustrates an example call flow diagram, in accordance with aspects of the present disclosure.

FIG. 7 illustrates an example call flow diagram 700 illustrating a transmitting and receiving device performing operations 500 and 600 described above. As illustrated, the transmitter may send a first frame, before transmitting an RTS frame, to allow the receiver to switch from the omnidirectional receive mode to a directional mode. The receiver may then process the RTS frame in the directional mode.

In some cases, the first frame may be obtained via a single channel of the plurality of channels. The at least one RTS frame may include a separate RTS frame obtained via each of the plurality of channels. In some cases, the first frame may be a management frame. In some cases, the type of the first frame may cause the receiver to be placed into the first receiver mode. In some cases, a bit or field of the first frame may cause the receiver to be placed into the first receiver mode. In some cases, the receiver may adjust a receive antenna configuration of the apparatus after obtaining the at least one RTS frame.

In some cases, the first frame may be sent over an agreed upon single channel, sometimes referred to as the primary channel.

According to certain aspects, the transmitter may send duplicate RTS frames on each channel. According to such aspects, the receiver may combine corresponding signals received on each of the channels in a non-linear way to perform RTS frame detection. This combining may help compensate for reduced power of each duplicate RTS frame and avoids the use of the first frame.

FIG. 8 illustrates example operations 800 that may be performed by a receiving apparatus (receiver), in accordance with aspects of the present disclosure. The receiving apparatus may be any suitable type of wireless node, for example, receiving duplicate RTS frames, as described above.

The operations 800 begin, at 802, by obtaining, from a wireless node, a signal related a request to send (RTS) frame via more than one of a plurality of channels that form a bonded channel. At 804, the receiver combines the signals related to the RTS frames. At 806, the receiver performs RTS frame detection based on the combined signals.

In some cases, the RTS frame obtained via each channel is a duplicate of an RTS frame obtained via another channel. In some cases, the combining may involve combining log likelihood ratios (LLRs) associated with the obtained RTS frames. In one more cases, for example, the combining may include combining log likelihood ratio (LLRs) before forward error correction (FEC) decoding associated with the obtained RTS frames. In some cases, the receiver may perform channel estimation for each of the plurality of channels and to perform the RTS frame detection based on the channel estimations. In some cases, the receiver may adjust a receive antenna configuration of the apparatus after obtaining the RTS frames. According to one or more examples, adjusting a receive antenna configuration of the apparatus after obtaining the at least one RTS frame may be done by one or more other elements. In some cases, at least one of time-tracking, phase tracking, or frequency tracking may be done jointly on one or more of the plurality of channels and, in such cases, the RTS frame detection may be performed based on the combined time-tracking, phase tracking, or frequency tracking.

As noted above, the RTS frame may serve various purposes. For example, a receiving device may determine the transmit opportunity (TXOP) for all the bonded channels. Therefore, the receiving device may avoid the bonded channels if it is not an intended recipient (e.g., to avoid interference). In addition, the RTS may help direct the receiving device receive antenna to the direction of the originating source of the RTS. This may help the receiving device to be able to receive communication from all directions.

Figure 5A:
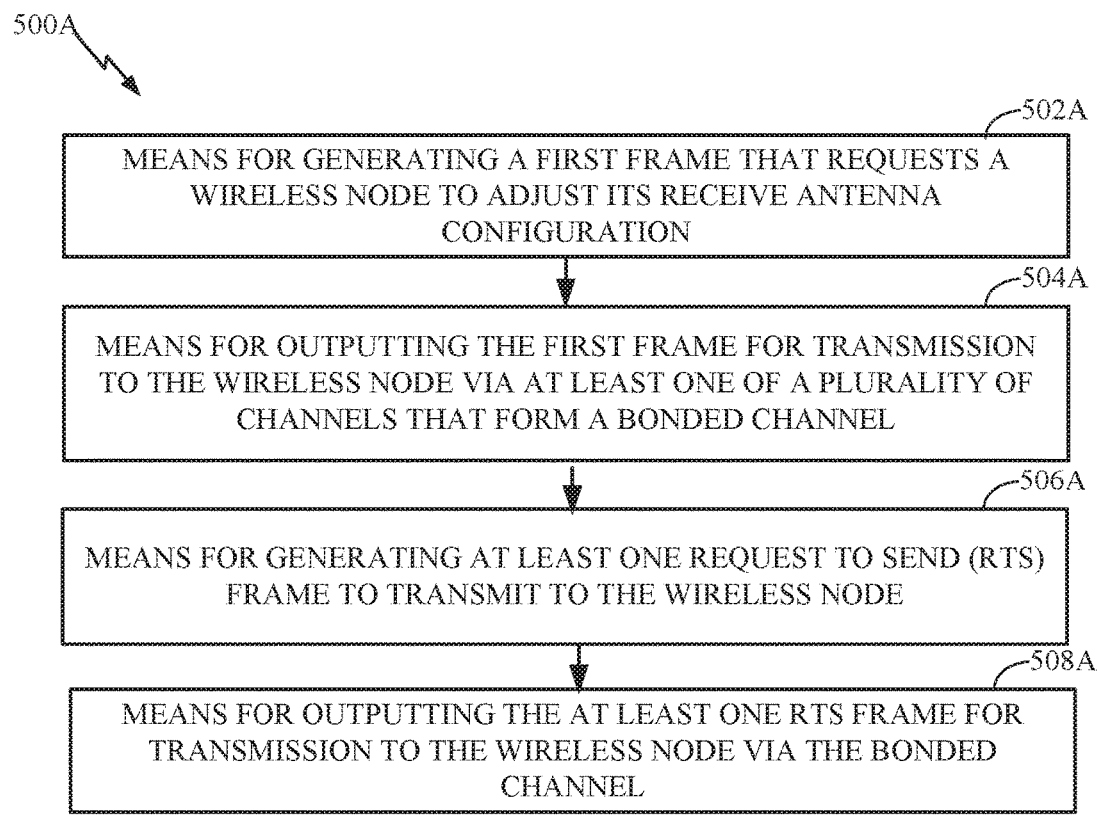
FIG. 5A illustrates example means capable of performing the operations illustrated in FIG. 5.
Figure 6A:
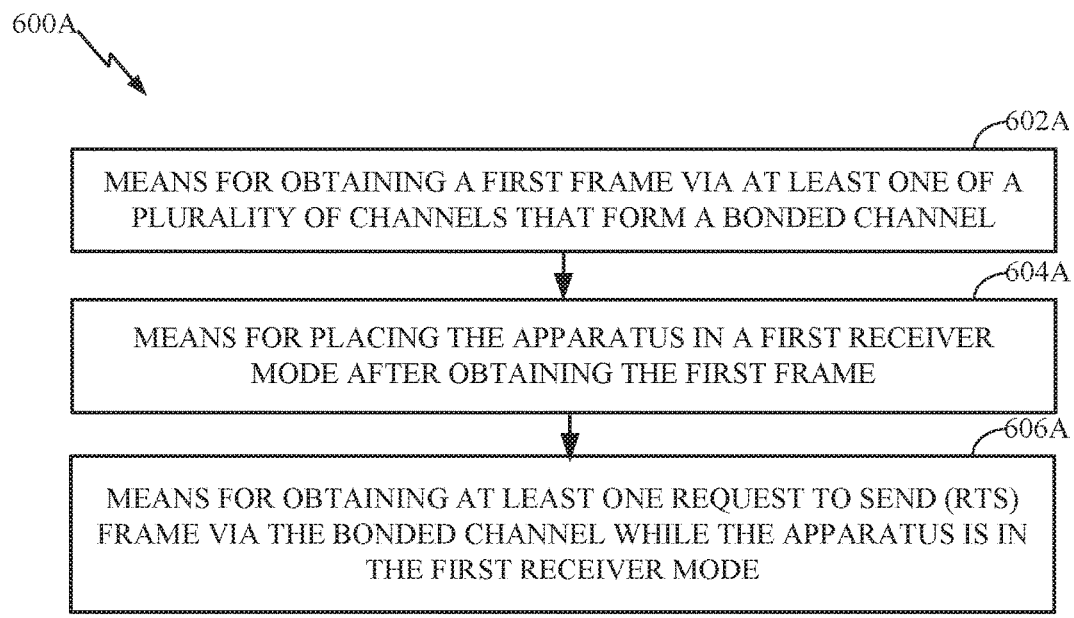
FIG. 6A illustrates example means capable of performing the operations illustrated in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500, 600, and 800 illustrated in FIGS. 5, 6, and 8 may correspond to means 500A, 600A, and 800A illustrated in FIGS. 5A, 6A, and 8A.

For example, means for transmitting (or means for outputting for transmission) may include a transmitter (e.g., the transmitter unit of a transceiver 222) and/or an antenna(s) 224 of the access point 110 or the transmitter unit of a transceiver 254 and/or antenna(s) 252 of the user terminal 120 illustrated in FIG. 2. Means for receiving (or means for obtaining) may include a receiver (e.g., the receiver unit of a transceiver 222) and/or an antenna(s) 224 of the access point 110 or the receiver unit of a transceiver 254 and/or antenna(s) 252 of the user terminal 120 illustrated in FIG. 2. Means for processing, means for generating, means for performing frequency offset adjustment, or means for determining, may include a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame, a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

Means for placing, means for combining, and means for performing RTS frame detection may, for example, correspond to any of the processors described above.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may include a single instruction, or many instructions, and may be distributed over several different code segments, among different programs, and across multiple storage media. A storage medium may be coupled to a processor such that the processor may read information from, and write information to, the storage medium. In the alternative, the storage medium may be integral to the processor.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may include packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may include a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to generate a first frame that requests a wireless node to adjust its receive antenna configuration from an omni mode to a directed mode associated with a bonded channel; and
an interface configured to output the first frame for transmission to the wireless node via at least one of a plurality of channels that form the bonded channel; wherein
the processing system is further configured to generate at least one request to send (RTS) frame, and
the interface is further configured to output the at least one RTS frame for transmission to the wireless node via the bonded channel.

2. The apparatus of claim 1, wherein the first frame is output for transmission to the wireless node via a single channel of the plurality of channels.

3. The apparatus of claim 1, wherein the at least one RTS frame comprises a separate RTS frame output for transmission on each of the plurality of channels.

4. The apparatus of claim 1, wherein the first frame comprises a management frame.

5. The apparatus of claim 1, wherein:
the processing system is further configured to select a type of the first frame to signal the wireless node to adjust its receive antenna configuration; and
generation of the first frame is based on the selected type.

6. The apparatus of claim 1, wherein the first frame has at least one bit that signals the wireless node to adjust its receive antenna configuration.

7. An apparatus for wireless communications, comprising:
an interface configured to obtain a first frame via at least one of a plurality of channels that form a bonded channel; and
a processing system configured to place the apparatus in a first receiver mode associated with the bonded channel after obtaining the first frame; wherein the interface is also configured to obtain at least one request to send (RTS) frame via the bonded channel while the apparatus is in the first receiver mode.

8. The apparatus of claim 7, wherein the first receiver mode comprises a directional receiver mode in which the apparatus adjusts a receive antenna configuration to enhance reception from a particular direction.

9. The apparatus of claim 7, wherein the first frame is obtained via a single channel of the plurality of channels.

10. The apparatus of claim 7, wherein:
the at least one RTS frame comprises a separate RTS frame obtained via each of the plurality of channels; and
the processing system is configured to combine signals related to the separate RTS frames and to perform detection of the at least one RTS frame based on the combined signals.

11. The apparatus of claim 7, wherein the processing system is configured to place the apparatus in the first receiver mode based on a type of the first frame.

12. The apparatus of claim 7, wherein the processing system is configured to place the apparatus in the first receiver mode based on at least one bit in the first frame.

13. The apparatus of claim 7, wherein the processing system is further configured to adjust a receive antenna configuration of the apparatus after obtaining the at least one RTS frame.

14. An apparatus for wireless communications, comprising:
an interface configured to obtain, from a wireless node, a separate request to send (RTS) frame via each of a plurality of channels that form a bonded channel; and
a processing system configured to combine signals related to the separate RTS frames obtained via the plurality of channels that comprises generating log likelihood ratios (LLRs) based on signals related to each of the RTS frames and combining the LLRs;
wherein the processing system is further configured to perform RTS frame detection based on the combined signals; and
wherein the processing system is further configured to process a detected RTS frame to determine whether the apparatus is an intended recipient of the detected RTS frame, to generate a clear to send (CTS) frame if the apparatus is the intended recipient, or to avoid causing transmissions on the bonded channel for a duration if the apparatus is not the intended recipient.

15. The apparatus of claim 14, wherein each separate RTS frame is a duplicate of each other.

16. The apparatus of claim 14, wherein the processing system is further configured to perform a channel estimation for each of the plurality of channels and to perform the RTS frame detection based on the channel estimation for each of the plurality of channels.

17. The apparatus of claim 14, wherein:
the processing system is further configured to perform at least one of time-tracking, phase tracking, or frequency tracking jointly for more than one of the plurality of channels; and
the RTS frame detection is performed based on the time-tracking, phase tracking, or frequency tracking.

18. The apparatus of claim 14, wherein the processing system is further configured to adjust a receive antenna configuration of the apparatus after obtaining the separate RTS frames.

* * * * *